(12) United States Patent
Rutkis et al.

(10) Patent No.: US 11,656,127 B2
(45) Date of Patent: May 23, 2023

(54) HIGH-BANDWIDTH THERMOELECTRIC THIN-FILM UV, VISIBLE LIGHT AND INFRARED RADIATION SENSOR AND A METHOD FOR MANUFACTURING THEREOF

(71) Applicant: LATVIJAS UNIVERSITATES CIETVIELU FIZIKAS INSTITUTS, Riga (LV)

(72) Inventors: Martins Rutkis, Salaspils pagasts (LV); Aivars Vembris, Riga (LV); Kaspars Pudzs, Baldone (LV); Janis Busenbergs, Riga (LV)

(73) Assignee: LATVIJAS UNIVERSITATES CIETVIELU FIZIKAS INSTITUTS, Riga (LV)

( * ) Notice: Subject to any disclaimer, the term of this patent is extended or adjusted under 35 U.S.C. 154(b) by 91 days.

(21) Appl. No.: 17/606,622

(22) PCT Filed: Sep. 20, 2019

(86) PCT No.: PCT/IB2019/057963
§ 371 (c)(1),
(2) Date: Oct. 26, 2021

(87) PCT Pub. No.: WO2020/095126
PCT Pub. Date: May 14, 2020

(65) Prior Publication Data
US 2022/0364929 A1   Nov. 17, 2022

(30) Foreign Application Priority Data

Apr. 26, 2019   (LV) .......................... P-19-24

(51) Int. Cl.
*G01J 5/12*   (2006.01)

(52) U.S. Cl.
CPC ....................... *G01J 5/12* (2013.01)

(58) Field of Classification Search
CPC .................. G01J 5/12; G01J 5/046
See application file for complete search history.

(56) References Cited

U.S. PATENT DOCUMENTS

| 6,100,463 A * | 8/2000 | Ladd ............... H10N 10/01 |
| | | 136/201 |
| 10,236,431 B2 * | 3/2019 | Hayashi ........... H10N 10/13 |
| (Continued) | | |

FOREIGN PATENT DOCUMENTS

JP   2001135868 A   5/2001

OTHER PUBLICATIONS

International Search Report for PCT/IB2019/057963, prepared by the European Patent Office, dated Jan. 1, 2020, 3 pages.

*Primary Examiner* — Marcus H Taningco
(74) *Attorney, Agent, or Firm* — Brooks Kushman P.C.; John E. Nemazi

(57) ABSTRACT

The invention relates to UV, visible light and infrared radiation sensors, in particular to high-bandwidth thin-film electromagnetic radiation sensors, operating using the principle of thermoelectric effect. According to one embodiment the sensor comprises: a thermoelectric active layer, an electrode layer one and an electrode layer two, wherein the electrode layer one is located below the thermoelectric active layer and the electrode layer two is located above the thermoelectric active layer, whereby the sensor is designed so that the thermal gradient can be created and the electrical voltage can be measured perpendicular to the thermoelectric active layer, between the electrode layer one and the electrode layer two, wherein the material of the thermoelectric active layer is low molecular weight organic compound, selected so that its thermal conductivity would be less than (Continued)

1 W/(m K^2), Seebeck coefficient modulus would be greater than 100 μV/K and its molecular weight is less than 900 Da.

9 Claims, 3 Drawing Sheets

(56) References Cited

U.S. PATENT DOCUMENTS

| | | | |
|---|---|---|---|
| 2004/0016923 A1 | 1/2004 | Yu et al. | |
| 2010/0031992 A1* | 2/2010 | Hsu | G01J 5/12 136/223 |
| 2014/0091304 A1* | 4/2014 | Semerad | G01J 1/4257 257/49 |
| 2014/0091307 A1* | 4/2014 | Semerad | G01J 5/12 257/64 |
| 2016/0013390 A1* | 1/2016 | Nishio | H10N 10/17 136/205 |
| 2020/0403136 A1* | 12/2020 | Adachi | H02N 11/00 |
| 2022/0155141 A1* | 5/2022 | Hirose | H10N 15/00 |

* cited by examiner

HIGH-BANDWIDTH THERMOELECTRIC THIN-FILM UV, VISIBLE LIGHT AND INFRARED RADIATION SENSOR AND A METHOD FOR MANUFACTURING THEREOF

CROSS-REFERENCE TO RELATED APPLICATION

This application is the U.S. national phase of PCT Application No. PCT/IB2019/057963 filed on Sep. 20, 2019, which claims priority to LV Patent Application No. P-19-24 filed on Apr. 26, 2019, the disclosures of which are incorporated in their entirety by reference herein.

TECHNICAL FIELD

The present invention relates to a high-bandwidth thin-film electromagnetic (UV, visible light and IR) radiation sensor operating on the principle of thermoelectric (TE) effect.

BACKGROUND ART

UV, Visible and IR radiation detectors commonly are based on photodiodes or thermopiles, both having pros and cons.

Photodiodes has limited spectral range that is determined by semiconductor properties of photo-diode material, where photon energy of radiation is converted to the electron-hole pair generating current, which is used to measure radiation power. The advantages of photodiodes are fast temporal response, with rise time typically in sub microseconds range, some even in sub nanoseconds range.

In thermopile sensors radiation is first converted to the heat, by absorbing radiation in the absorber element. Generated heat produce thermal gradient on thermocouples attached to the absorber element, where thermoelectric effect produce voltage. Radiation power is measured by generated voltage or current on thermocouples. Response spectral range depends on absorption spectrum of absorber element and usually it is wide, from UV to far IR. The biggest disadvantage of thermopile sensors are their slow response compared with photodiodes. In addition, it depends on the sensor geometry and dimensions.

Reducing the dimensions can improve the temporal response. One way is to use thin films. Traditionally the thin-film thermoelectric radiation sensor operation is based on the TE effect in the thin-film plane [1-5], and for the increase of sensitivity several thermoelectric active elements or thermo-pairs are linked in series [6]. The advantage of such a circuit is the high sensitivity, but the response time of such sensors is usually slow and performance does not exceed 1 kHz.

There is known a thermoelectric radiation detector (U.S. Pat. No. 5,793,092 A) having a substrate and a film of solid-state material having thermal anisotropy and containing $YBa_2Cu_3O_7$, formed on the surface of the substrate, and wherein said film has $CuO_2$ planes inclined with respect to the substrate plane.

There is known a laser-radiation sensor (EP3022537) comprising a copper substrate on which an oriented polycrystalline buffer layer is grown surmounted by an oriented polycrystalline sensor-element of an anisotropic transverse thermoelectric material. An absorber layer, thermally connected to the sensor-element, is heated by laser-radiation to be measured and communicates the heat to the sensor-element, causing a thermal gradient across the sensor-element. Two or more protection layers are positioned between the sensor layer and the absorber layer. Spaced-apart electrodes in electrical contact with the sensor-element sense a voltage corresponding to the thermal gradient as a measure of the incident laser-radiation power.

The main disadvantage of the known transverse thermoelectric radiation detectors is the relative complex production and the necessary for the buffer layer on substrate, mainly to produce fabricate anisotropic polycrystalline thin film and buffer layer under absorption layer to isolate the electrode and active element structure.

SUMMARY OF THE INVENTION

The aim of the invention is reached by providing a high-bandwidth (i.e. having signal rise time <10 ns, fall time <1 µs and area >1 mm²) thermoelectric thin-film UV, visible light and infrared radiation sensor comprising: an organic thermoelectric active layer, an electrode layer one and an electrode layer two, wherein the electrode layer one is located below the thermoelectric active layer and the electrode layer two is located above the thermoelectric active layer, whereby the sensor is designed so that the thermal gradient can be created and the electrical voltage can be measured perpendicular to the thermoelectric active layer. The material of the thermoelectric active layer is low molecular weight organic compound, selected so that its thermal conductivity of the layer would be less than $$1\frac{W}{mK^2},$$

Seebeck coefficient modulus would be greater than $$100\frac{\mu V}{K}$$

and its molecular weight is less than 900 Da. According to the embodiment of the invention a tetrathiotetracene is used as the organic thermoelectric active layer. According to another embodiment the sensor may further comprise a substrate and an absorption layer.

Another aspect of the invention is a method for the manufacture of the thermoelectric thin-film radiation sensor comprises the following steps: (i) providing an electrode one having an electrical resistance of less than 15 Ω/square; (ii) depositing a 100-1000 nm thick thermoelectric active layer on the top of the electrode one by thermal evaporation in vacuum; (iii) providing an electrode two having an electrical resistance of less than 15 Ω/square, on top of the thermoelectric active layer by physical vapour deposition in vacuum. The method may comprise an optional step (iv) of applying an absorption layer on top of the electrode two. The method of application of the absorption layer depends on the properties of the absorber itself, and can be various physical vapour deposition methods.

SHORT DESCRIPTION OF DRAWINGS

b—sensor substrate with applied electrode layer one, c—with applied thermoelectric active layer, d—applied the electrode layer two, f—applied optional light absorption layer.

Figure 8:
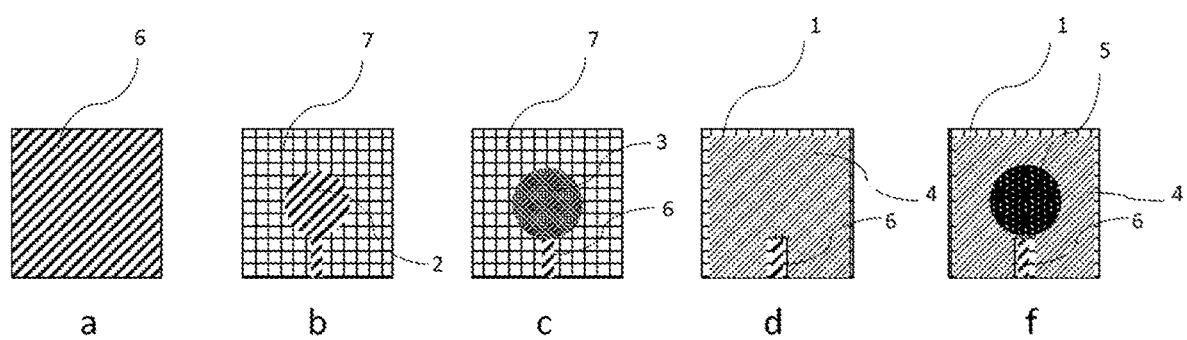

FIG. 8: is a schematic representation of another embodiment of the sensor manufacture on electrically conductive substrate, where: a—a thermally conductive $$\left(\text{thermal conductivity} > 10 \frac{W}{mK^2}\right)$$

and electrically conductive (electrical resistivity 15 Ω/square) substrate, b—substrate with applied insulating layer, c—with applied thermoelectric active layer, d—applied the electrode layer two, f—applied optional light absorption layer.

DETAILED DESCRIPTION OF THE INVENTION

The operation of the sensor according to the present invention is based on the thermoelectric effect perpendicular to the plane of the thin-film, i.e. in the direction of the smaller dimension of the thermoelectric active layer, in which also the electrical voltage is measured. The existing sensor structure allows to develop active area sensors of different sizes, which active area is not limited to the size of the sensor structure, as it is in the known MEMS systems.

Figure 1:
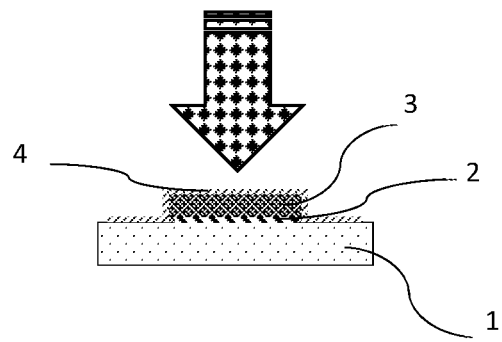
FIG. 1 shows structural scheme of one embodiment of the invention as well as direction of sensor operation, where 1 is a heat conducting substrate of the sensor, 2—an electrode layer one, 3—a thermoelectric active layer, 4—an electrode layer two.

The proposed high-bandwidth thermoelectric thin-film UV, visible light and infrared radiation sensor (FIG. 1) comprising: a 100-1000 nm thick organic thermoelectric active layer 3, an electrode layer one 2 and an electrode layer two 4. The electrode layer one 2 is located below the thermoelectric active layer 3 and the electrode layer two 4 is located above the thermoelectric active layer 3. The sensor is designed so that the thermal gradient is created and the electrical voltage can be measured perpendicular to the thermoelectric active layer 3—between the electrode layer one 2 and the electrode layer two 4. The material of the thermoelectric active layer 3 is low molecular weight organic compound, selected so that its thermal conductivity would be less than $$1 \frac{W}{mK^2},$$

Seebeck coefficient modulus would be greater than $$100 \frac{\mu V}{K}$$

and its molecular weight is less than 900 Da. Thermal resistance and Seebeck coefficient of layer 3 determine the response to the generated heat from absorbed radiation. The thermal resistance must be sufficiently high to produce high enough thermal gradient, therefore thickness of organic thermoelectric active layer 3 need to be greater than 100 nm if the thermal conductivity is close to $$1 \frac{W}{mK^2}.$$

On the other hand, the thicker the layer, the lower the bandwidth, so the thickness of organic thermoelectric active layer 3 should not exceed 1000 nm.

Figure 2:
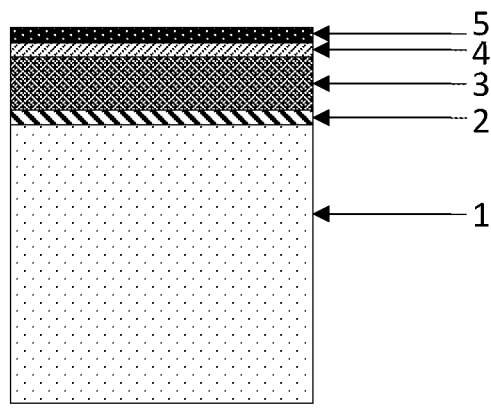
FIG. 2 is a schematic representation of a cross-section of another embodiment of the sensor, where 1 is a heat conducting substrate of the sensor, 2—an electrode layer one, 3—a thermoelectric active layer, 4—an electrode layer two, 5—optional absorption layer.

According to another embodiment (FIG. 2), the sensor may comprise an absorption layer 5, located on the electrode layer two 4. According to yet another embodiment, the electrode layer one 2 has a thickness greater than 100 µm, so that it can serve also as a substrate. The electrode layer one 2 and the electrode layer two 4 can be made of copper, aluminium, gold, silver or other appropriate material, such as their alloys. The copper is preferred material due to its high thermal conductivity and relatively low cost. The thermoelectric active layer 3 according to the invention may be a metal phthalocyanines, such as copper or zinc phthalocyanine, perylene derivative, or polyacene derivatives, such as pentacene or tetrathiotetracene.

Figure 3:
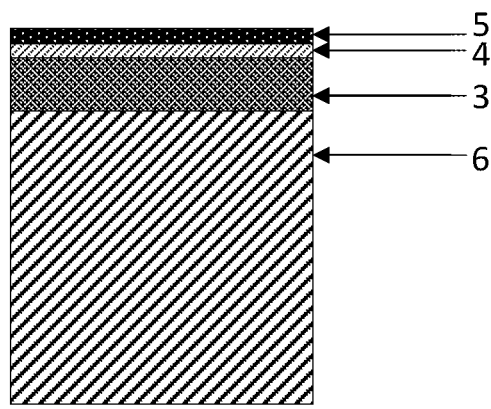
FIG. 3 is a schematic view of a cross-section of the sensor on an electrically conductive substrate, wherein 6—is an electrode layer one having thickness greater than 100 µm, and serving as an electrically conductive substrate, 3—a thermoelectric active layer, 4—an electrode layer two, 5—optional absorption layer.

The sensor according to yet another embodiment (FIG. 3) may comprise a substrate 1 having $$\text{thermal conductivity} > 10 \frac{W}{mK^2}$$

and electrical resistivity >15 Ω/square, to which the electrode one 2 is attached along its surface, which is opposite to the electrode one 2 surface to which the thermoelectric active layer 3 is deposited.

The UV/visible light/infrared radiation falling on the sensor heats up the electrode layer two 4 (FIG. 1), creating a thermal gradient in the thermoelectric active layer 3 perpendicular to the plane of the thermoelectric active layer 3. A thermal gradient is formed and the electrical voltage is measured in the direction of the smallest dimension. The thermoelectric effect in the thermoelectric active layer 3 produces an electrical voltage in the direction of the thermal gradient. As the thermal conductivity of the thermoelectric active layer 3 is low $$\left(<1\frac{W}{mK^2}\right)$$

and Seebeck coefficient modulus is high $$\left(>100\frac{\mu V}{K}\right),$$

the generated thermal gradient is high enough to produce ample electric voltage by TE effect. The voltage further could be amplified with high performance amplifiers. As the thermoelectric active layer 3 has a thickness of less than 1 μm, the propagation of heat between the electrodes 2 and 4 is rapid, enabling the development of a high-bandwidth radiation sensor.

Figure 4:
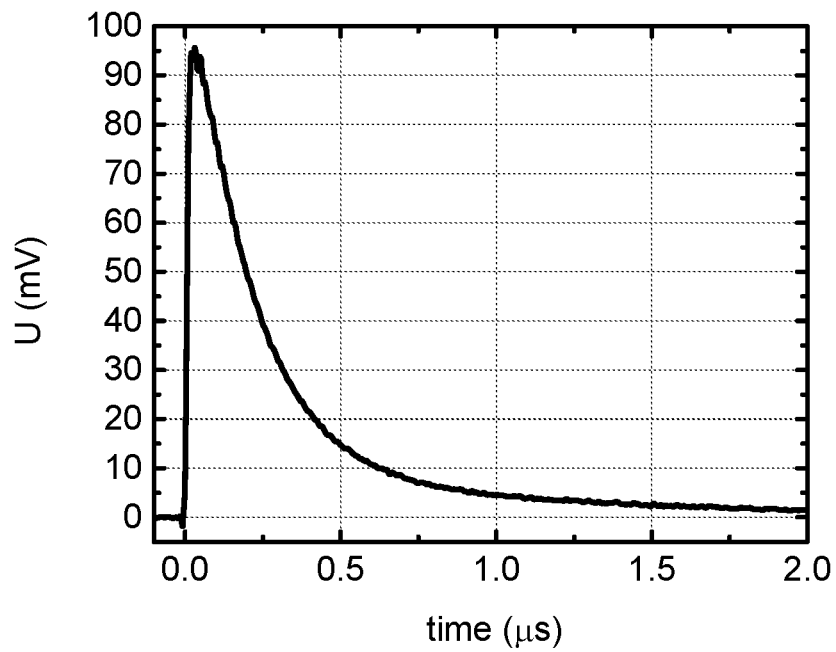
FIG. 4 is a diagram, showing graph of a signal of the sensor without an absorption layer, irradiated with a 10 ns pulse of 1064 nm, pulse peak power 1 kW.
Figure 5:
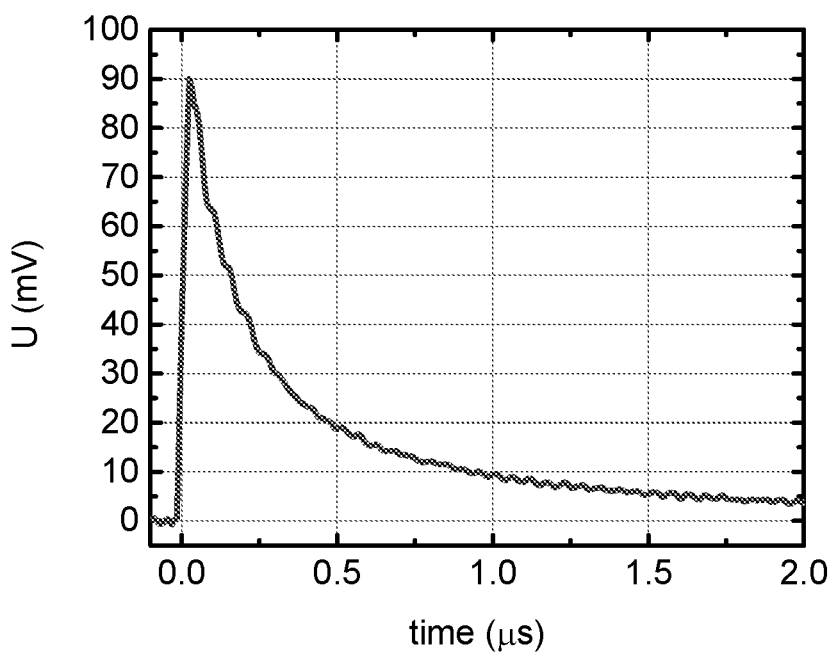
FIG. 5 is a diagram, showing graph of a signal of the sensor without an absorption layer, irradiated with a 10 ns pulse of 430 nm impulse, pulse peak power 2.3 kW.
Figure 6:
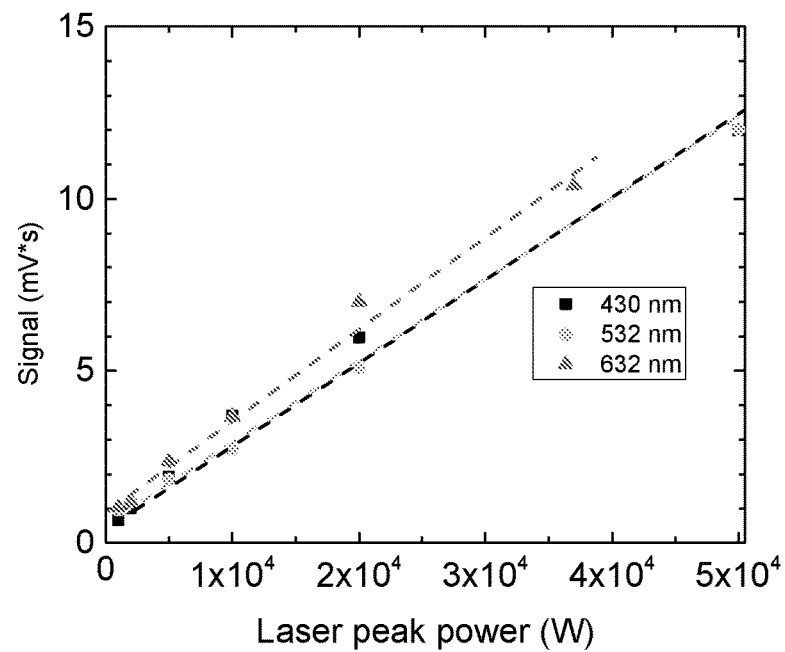
FIG. 6 is a diagram, showing values of the sensor signal integral for different irradiance wavelengths as a function of pulse peak power; integration time 0.2 µs.

FIGS. 4 and 5 show the signal of a sensor whose thermoelectric active layer 3 is made of tetrathiotetracene by irradiating it with a 10 ns laser pulse of 1064 nm. It could be seen that the length of the increasing front of the signal is 10 ns, while the decreasing time constants are below 1 μs.

The method for the manufacture of the high-bandwidth thermoelectric thin-film UV, visible light and infrared radiation sensor, comprising the following steps: (i) providing an electrode one 2 having an electrical resistance of less than 15 Ω/square; ii depositing a 100-1000 nm thick thermoelectric active layer 3 on the top of the electrode one 2 by thermal evaporation in vacuum; (iii) providing an electrode two 4 having an electrical resistance of less than 15 Ω/square, on top of the thermoelectric active layer 3 by physical vapour deposition in vacuum; and optional step of (iv) applying an absorption layer 5 on top of the electrode two 4.

According to another embodiment the method further comprises the step (i') of providing a substrate 1 having a $$\text{thermal conductivity} > 10\frac{W}{mK^2}$$

and resistivity >15 Ω/square, the substrate 1 on which the electrode one 2 is deposited by physical vapour deposition along its surface, which is opposite to the electrode one 2 surface to which the thermoelectric active layer 3 is to be deposited or is deposited.

According to yet another embodiment the method further comprises the step (v) of applying an electrically non-conductive insulation layer of necessary shape on the electrode one 2 before step (ii) to define the conductive area of the electrode one 2.

Figure 7:
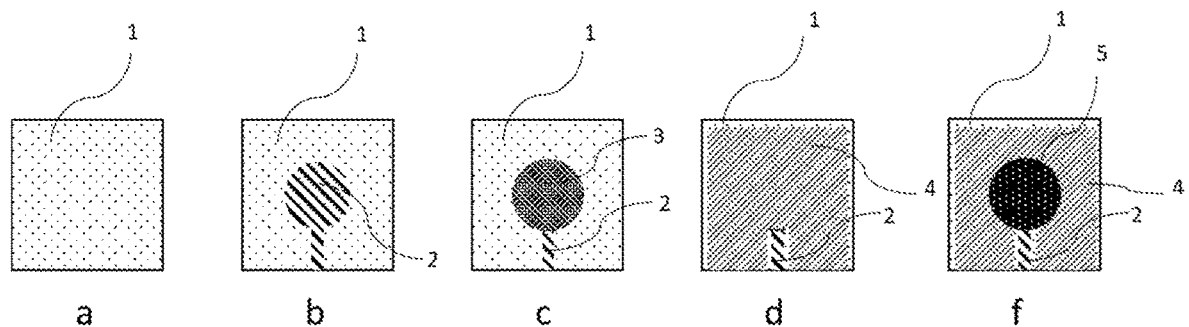
FIG. 7 is a schematic representation of sensor manufacture on electrically non-conductive (electrical resistivity >15 Ω/square) substrate, where: a—sensor substrate $$\left(\text{thermal conductivity} > 10 \frac{W}{mK^2}\right),$$

In the manufacture of the sensor, thin-film technologies in vacuum are used. An electrode one 2 of the required shape (FIG. 7b) is applied to the heat-conducting substrate 1 (FIG. 7a), if it is not electrically conductive. Applying the electrode comprises mainly of one or two steps. If necessary, in the first step a electrode adhesion to substrate-improving layer such as Cr layer, is applied to the substrate. In the second step, the electrode layer itself is applied. By thermal evaporation in vacuum method, an organic thermoelectric layer 3 having a thickness 100-1000 nm is applied to the electrode (FIG. 7c). The electrode layer two 4 is applied to the thermoelectric layer 3 (FIG. 7d). An optional radiation absorption layer 5 is applied over the electrode two 4 (FIG. 7f).

When a thermally conductive and electrically conductive substrate 6 is used (FIG. 8a), which also serves as an electrode layer one 2, an insulating layer 7 of necessary shape can be applied thereto (FIG. 8b). The thermoelectrically active layer 3 of organic materials having a thickness of 100-1000 nm is applied over the opened electrode one 2 portion by thermal evaporation in vacuum method (FIG. 8c). The electrode layer two 4 is applied to the thermoelectrically active layer (FIG. 8d). An optional radiation absorption layer 5 is applied over the electrode layer two 4 (FIG. 8f).

Examples of Implementation of the Invention

Table 1 provides a list of potentially suitable materials for sensor productions. Sensor could be made by various combinations of materials, but the main properties that organic thermoelectric materials should have are low thermal conductivity of formed thin film $$\left(<1\frac{W}{mK^2}\right)$$

and high Seebeck coefficient modulus $$\left(>100\frac{\mu V}{K}\right).$$

Preferred electrode material is copper due to its high thermal conductivity and relatively low cost.

TABLE 1

List of materials, that could be used to produce the sensor

| Electrode one | Organic TE active layer | Electrode two |
| --- | --- | --- |
| Aluminium | Copper phthalocyanine | Aluminium |
| Cu | Zinc phthalocyanine | Cu |
| Gold | Other metal phthalocyanine derivatives | Gold |
| Silver | Pentacene | Silver |
| Alloys | Tetrathiotetracene | Alloys |
| | Other polyacene derivatives | |
| | Perylene derivatives | |

Some examples are detailed below. Example 1—sensor on electrically non-conducting substrate. The electrode layer one 2 consisting of Cr layer with a thickness of 10 nm and a Cu layer with a thickness of 190 nm is applied to the Si substrate 1. Cr is used to improve adhesion. A 500 nm thick tetrathiotetracene layer is applied over the electrode layer one 2 as the thermoelectric active layer 3. A 100 nm thick Cu electrode layer two 4 is applied above it.

Example 2—sensor on the conductive substrate. On the Cu substrate 6, an insulating layer 7 is formed from the photoresist SU-8 by a lithographic method. Above the exposed Cu layer, a 500 nm thick tetrathiotetracene layer is applied as the thermoelectric active layer 3. A 100 nm thick Cu electrode layer two 4 is applied above it.

The proposed sensor has a relatively simple design with operating principle (thermal gradient and electric voltage) in smallest dimension perpendicular to the thin film plane using organic TE active materials with low thermal conductivity. No buffer layer is required in these sensors where electric field is measured perpendicular to the plane of the thin film. Another and very important advantage of the invention over the sensors known to date is that it is possible to make a large-area sensor without reducing its high-bandwidth. Moreover, such a sensor is almost one order faster than the prior art ones due to the different voltage measurement direction.

SOURCES OF INFORMATION

[1] A. G. Kozlov, "Optimization of thin-film thermoelectric radiation sensor with comb thermoelectric transducer," *Sensors Actuators A Phys.*, vol. 75, no. 2, pp. 139-150, May 1999.
[2] A. G. Kozlov, "Optimization of thin-film thermoelectric radiation sensor with separate disposition of absorbing layer and comb thermoelectric transducer," *Sensors Actuators A Phys.*, vol. 84, no. 3, pp. 259-269, September 2000.
[3] L. M. Goncalves et al., "Fabrication of flexible thermoelectric microcoolers using planar thin-film technologies, "*J. Micromechanics Microengineering*, vol. 17, no. 7, pp. S168-S173, July 2007.
[4] Z. Dashevsky, E. Rabih, V. Kasiyan, A. Halfin, and M. P. Dariel, "Development of thin film thermoelectric sensors for a wide spectral range in the MEMS configuration, " in 2006 *25th International Conference on Thermoelectrics*, 2006, pp. 180-183.
[5] R. Lenggenhager, H. Baltes, and T. Elbel, "Thermoelectric infrared sensors in CMOS technology," *Sensors Actuators A Phys.*, vol. 37-38, no. C, pp. 216-220, June 1993.
[6] D. Xu, Y. Wang, B. Xiong, and T. Li, "MEMS-based thermoelectric infrared sensors: A review," *Front. Mech. Eng.*, vol. 12, no. 4, pp. 557-566, 2017.

The invention claimed is:

1. A thermoelectric thin-film UV, visible light and infrared radiation sensor, having signal rise time <10 ns and fall time <1 μs, comprising: a 100-1000 nm thick thermoelectric active layer, an electrode layer one and an electrode layer two, wherein the electrode layer one is located below the thermoelectric active layer and the electrode layer two is located above the thermoelectric active layer, whereby the sensor is designed so that the thermal gradient can be created and the electrical voltage can be measured perpendicular to the thermoelectric active layer, between the electrode layer one and the electrode layer two, wherein the material of the thermoelectric active layer is low molecular weight organic compound, selected from the group consisting of metal phthalocyanines, perylene derivatives and polyacene derivatives, so that its thermal conductivity would be less than $$1\frac{W}{mK^2},$$

Seebeck coefficient modulus would be greater than $$100\frac{\mu V}{K}$$

and its molecular weight is less than 900 Da.

2. The sensor according to claim 1, further comprising an absorption layer, located on the electrode layer two.
3. The sensor according claim 1, wherein the electrode layer one has a thickness greater than 100 μm, so that it can serve also as a conductive substrate.
4. The sensor according claim 1, wherein the electrode layer one and the electrode layer two are made of copper, aluminium, gold, silver or their alloys.
5. The sensor according claim 1, wherein the sensor further comprises a substrate having $$\text{thermal conductivity} > 10\frac{W}{mK^2}$$

and electrical resistivity >15 Ω/square, to which the electrode one is attached along its surface, which is opposite to the electrode one surface to which the thermoelectric active layer is deposited.

6. A method for the manufacture of the thermoelectric thin-film UV, visible light and infrared radiation sensor having signal rise time <10 ns and fall time <1 μs, according to any one of claims 1-5, comprising the following steps:
   providing an electrode one having an electrical resistance of less than 15 Ω/square;
   depositing a 100-1000 nm thick thermoelectric active layer on the top of the electrode one by thermal evaporation in vacuum; wherein the material of the thermoelectric active layer is selected from the group consisting of metal phthalocyanines, perylene derivatives and polyacene derivatives;
   providing an electrode two having an electrical resistance of less than 15 Ω/square, on top of the thermoelectric active layer by physical vapour deposition in vacuum;
   and optional step of
   (iv) applying an absorption layer on top of the electrode two.

7. The method according to claim 6, wherein the material, selected for the electrode layer one and the electrode layer two is selected from the group consisting of copper, aluminium, gold, silver and their alloys.
8. The method according to claim 6, the method further comprising the step (i') of providing a substrate having $$\text{thermal conductivity} > 10\frac{W}{mK^2}$$

and resistivity >15 Ω/square, the substrate on which the electrode one is deposited by physical vapour deposition along its surface, which is opposite to the electrode one surface to which the thermoelectric active layer is to be deposited or is deposited.

9. The method according to claim 6, the method further comprising the step (v) of applying an electrically nonconductive insulation layer of necessary shape on the electrode one before step (ii) to define the conductive area of the electrode one.

* * * * *